United States Patent [19]
Carson

[11] Patent Number: 6,028,920
[45] Date of Patent: Feb. 22, 2000

[54] PRE-PAID PHONE CARD SYSTEM WITH PROMOTIONAL LINK

[75] Inventor: John T. Carson, Pennington, N.J.

[73] Assignee: Creative Games International, Inc., North Smithfield, R.I.

[21] Appl. No.: 09/118,384

[22] Filed: Jul. 17, 1998

Related U.S. Application Data

[63] Continuation of application No. 08/941,678, Sep. 30, 1997.

[51] Int. Cl.[7] .................................................. H04M 17/00
[52] U.S. Cl. ........................ 379/144; 379/114; 379/93.13
[58] Field of Search .............................. 273/138.1, 138.2; 364/400, 410.1, 412.1; 379/91.01, 93.02, 93.03, 93.14, 112, 113, 144, 114, 355, 93.13; 235/380, 382; 463/16, 17, 25

[56] References Cited

U.S. PATENT DOCUMENTS

| | | | |
|---|---|---|---|
| 5,365,575 | 11/1994 | Katz ......................................... | 379/114 |
| 5,403,999 | 4/1995 | Entenmann et al. ..................... | 235/379 |
| 5,415,416 | 5/1995 | Scagnelli et al. ........................ | 273/439 |
| 5,504,808 | 4/1996 | Hamrick, Jr. ............................ | 379/144 |
| 5,608,785 | 3/1997 | Kasday ..................................... | 379/201 |
| 5,764,742 | 6/1998 | Howard et al. .......................... | 379/144 |

*Primary Examiner*—Curtis A. Kuntz
*Assistant Examiner*—Renford N Barnie
*Attorney, Agent, or Firm*—Duane, Morris & Heckscher LLP

[57] ABSTRACT

A method for providing telephone service and cooperatively promoting the sale of telephone usage services by a telephone service provider and the sale of goods and/or services such as lottery tickets associated with a lottery game by a lottery service provider. A phone card in accordance with the invention has a substrate such as paper, paperboard or plastic, a personal identification number (PIN) which can be covered by a removable opaque coating and machine readable indicia such as a bar code or magnetic strip used to activate the telephone card in a secure fashion and/or link the phone card to a lottery game such as a state run Pick 4, Pick 6, instant win game or the like. Users purchase the pre-paid phone card for a fixed fee which entitles the user to a set amount of long distance phone service and a promotional lottery ticket. The phone card is activated and a lottery ticket is issued at a lottery agent terminal. In the case of Pick 4 and Pick 6 games, the lottery number is selected via currently available methods such as user selection or a machine generated quick pick.

36 Claims, 5 Drawing Sheets

PRE-PAID PHONE CARD SYSTEM WITH PROMOTIONAL LINK

CROSS REFERENCE TO RELATED APPLICATION

This is a continuation in part of U.S. patent application Ser. No. 08/941,678, filed Sep. 30, 1997.

BACKGROUND OF THE INVENTION

1. Field of the Invention

This invention relates to methods and apparatus for the secure activation of a pre-paid telephone card and cooperative marketing of telephone usage authorization and other goods and/or services such as lottery services. Disposable telephone cards (phone cards) carrying pre-paid usage authorization credits and a personal identification number (PIN) for making telephone calls from public, business or residential telephones, are securely activated and/or related to the issuance and validation of lottery chances, especially for state sponsored lotteries that are operated independently of the phone system. The invention provides a method for secure activation of a pre-paid telephone card, cooperative promotion of telephone services by a telephone service provider as well as promoting sale of goods and/or services such as promotional lottery tickets associated with a lottery game or a credit towards the purchase of a lottery ticket associated with a lottery game by a lottery service provider.

The telephone card has a personal identification number (PIN) and an ID Code (i.e., machine readable and/or human readable indicia) both of which can be covered by a removable opaque coating. In a preferred embodiment the ID Code is a numeric or alpha numeric code imprinted on the surface of the telephone card. In another embodiment the ID Code is imprinted as a machine readable data carrying indicia such as a bar code or magnetic strip. The ID Code is used to initially activate the phone card and/or link the phone card to goods and/or services including lottery tickets for a lottery game such as a state run Pick-4, Pick-6, instant win ticket or similar games. Users purchase the pre-paid phone card for a fixed fee which entitles the user to a set amount of phone service (e.g., long distance calling time) and a promotional lottery ticket or at least a credit towards the purchase of a lottery ticket associated with a lottery game (a discount in the price of the lottery ticket). The promotional lottery ticket is printed or generated in a secure fashion via lottery agent terminals that normally operate independently for issuing and validating tickets via communications with a lottery computer system. The phone card is also activated using the ID Code in a secure fashion via the lottery agent terminals via communications with a telephone service provider.

2. Prior Art

Pre-paid telephone cards are currently available as a means to carry credits to place and concurrently pay for telephone calls from public, business or residential telephones. In general, a pre-paid phone card has a substrate such as paper, paperboard or plastic imprinted with indicia such as a pre-printed personal identification number (PIN) which can be covered by a removable opaque coating. A pre-paid phone card user purchases the phone card either directly or indirectly from a telephone service provider for a fixed amount of money such as $10.00. The telephone service provider maintains a central computer system which correlates the pre-printed PIN and the cash value or a fixed time usage value associated with the phone card and monitors usage of the card. As the phone card is used, the remaining value of the phone card is automatically debited by the central computer and/or by adjusting a representation of value on the card, until the cash value associated with the card is exhausted. In the alternative the phone card can be issued for a fixed number of minutes of long distance service, which are likewise debited as the card is used. The telephone service provider who issues the card in turn accounts for long distance service charges by making payments to long distance telephone companies such as AT&T, MCI and SPRINT in providing telephone service to the user. The particular long distance telephone carrier used normally is not relevant and is not disclosed to the user.

Usually, the card issuing telephone service provider maintains a toll free number and associated telephone equipment such as a private branch exchange (PBX) which is serviced or answered by an automated telephone answering system in data communication with a central computer. The pre-paid phone card is imprinted with the toll free number and instructions for users to follow in order to place calls in association with the phone card. Users are generally instructed to call the toll free number to initiate a call. The automated telephone answering system answers calls to the toll free number, provides audio instructions to the user prompting the user for telephone keypad input (touch tones) representing the PIN and the telephone number they wish to reach (called party number). The automated telephone answering system and/or central computer verify the PIN and the current cash or time value associated with the phone card, and assuming the card is valid and has a sufficient cash or time value, automatically dials the called party number thereby placing the telephone call for the user.

Telephone cards as described can be issued directly by the telephone service provider, or the provider can contract for its cards to be issued by others. Sales promotions, for example, can involve the printing of phone cards bearing trademarks of a product supplier to be given away to customers. Employers can obtain phone cards for the use of employees, etc.

In some cases, the user must first initialize an account prior to first using the phone card. Users are generally instructed to first call the toll free number in order to provide a user selected personal identification number (User PIN) to be uniquely associated with the phone card. The automated telephone answering system answers calls to the toll free number, provides audio instructions to the user and receives telephone key pad input from the user for entry of the User PIN. The automated telephone answering system and/or central computer system utilizes the User PIN and the pre-printed PIN to verify subsequent secure usage of the phone card prior to placement of a call.

A particular problem with current pre-paid phone cards is that the cards are either activated at the time of printing. That is, the cards are imprinted with all necessary information for initialization of an account. Therefore, pre-paid phone cards consistent with the prior art must be treated with the same security as cash, postage stamps, bearer bonds or the like. If newly printed cards are lost or stolen, they can be used by anyone who possesses them. Thus, the account initialization process set out above essentially protects against use of a previously initialized phone card and/or re-activation of an old phone card, as opposed to secure activation of new cards.

For lottery systems, various types of gaming forms are used. The structure of the gaming form depends on the type of lottery game associated with the form. Instant win games having "scratch off" coatings over game indicia are commonly available. The most common scratch off gaming form substrate is a lamination of paper stock and metallic foil or opaque paper so that the substrate is secure against candling or the like that might reveal game indicia. The game indicia is covered with an opaque or pigmented soft latex over a varnish release layer. The coating is removable by scratching with a coin or finger nail. By removing an opaque scratch off coating, concealed game information is revealed, or by removing a pigmented clear layer, selected game information can be marked, in each case to determine whether or not the game form is a winner.

Pre-paid phone cards are known with an associated scratch off instant win type of game printed on the phone card substrate. Such pre-paid phone cards may have a substrate carrying an identification number and may have indicia covered by a removable opaque coating for playing an instant win type of game. For example, the instant win game could be a scratch off game in which the user removes the opaque coating revealing six dollar prize amounts. A match of three identical dollar amounts is a winning ticket valued at the dollar amount. Such games are issued by the phone card issuer where regulations permit, and prizes are paid out by the phone card issuer. Due to regulations against gambling, a win in such a game may be limited, for example, to payment in kind (i.e., additional phone services) or to payment by delivery of a product. Additional sometimes onerous regulations apply in many jurisdictions.

Instant win games are limited in scope and prize value, and represent a smaller market share of total lottery ticket sales as compared to higher security games in which chances are issued via communications with a central lottery computer and the issue of a validated ticket that can be documented later if the ticket is presented as a winner. It would be advantageous to improve the methods and apparatus that allow a pre-paid telephone card to include a promotional game such that a more substantial gaming aspect can be included. According to the present invention, a phone card is used as a linking means permitting the card holder to enter a government-regulated state run lottery contest.

It would normally not be practical to issue telephone cards with associated lottery tickets applicable to a lottery game operated independently of the phone service provider, such as the Pick 4, Pick 6 or instant win game of a state sponsored lottery. A primary difficulty involves the manner in which the user or player selects lottery play entry numbers. Lottery service providers are hesitant to participate in selection of player entry numbers or winning lottery numbers, for security reasons, although assistance in play selections using randomized computer algorithms may be available on many lottery computer systems that dispense entries via agent terminal systems. Pre-printed phone cards having associated lottery tickets or player entry numbers would require the selection of lottery numbers in advance, and could expose the operation to potential breaches of security. This fact favors limiting promotions to small prizes (as with scratch off games) and reduces the potential extent of promotions.

It would be advantageous to provide a method for cooperatively promoting the sale of telephone usage services by a telephone service provider and goods and/or services such as a lottery ticket or a credit towards the purchase of a lottery ticket associated with a lottery game by a lottery service provider, that is secure and does not require assignment of player entry numbers in advance. It would also be advantageous to provide a method for secure activation of pre-paid telephone cards so that pre-printed cards cannot be activated if they are lost or stolen. It would also be desirable to utilize the existing infrastructure of state sponsored lotteries such as their agent terminals and central lottery computer systems for activation and tracking of functions, verification of lottery ticket issuance and redemption of lottery winnings subject to the security and regulation that makes large lotteries possible. Such a system would promote player interest and the provision of both phone and lottery system usage.

SUMMARY OF THE INVENTION

It is an object of the invention to provide a pre-paid telephone card (phone card) which can only be activated in a secure fashion so that lost or stolen cards cannot be used.

It is an object of the invention to provide a pre-paid telephone card which is linked to goods and/or services offer as part of a promotion.

It is an object of the invention to provide a pre-paid telephone card which is linked to a lottery game, and especially to provide convenient and secure means for entry into an independently operated state sponsored lottery game.

It is an object of the invention to provide a pre-paid telephone usage card system with cards having an identification code which can be associated with initial activation of the card.

It is an object of the invention to provide a pre-paid telephone usage card system with cards having an identification code which can be associated with the provision of goods and/or services as part of a promotion.

It is an object of the invention to provide a pre-paid telephone usage card system with cards having human readable or machine readable indicia such as a bar code or magnetic strip which can be associated with a separate lottery game ticket generated from an agent terminal of a lottery network independent of the issuer of the telephone cards.

It is yet another object of the invention to provide a pre-paid telephone card having human readable or machine readable indicia such as a bar code or magnetic strip which can be activated via a separate or pre-existing lottery agent terminal provided by a lottery service provider.

It is another object of the invention to provide a pre-paid telephone card having human readable or machine readable indicia such as a bar code or magnetic strip which can be read by a separate or pre-existing lottery agent terminal for generation, printing, activation and/or verification of a lottery ticket.

It is another object of the invention to provide a pre-paid telephone card system for use in conjunction with a separate or pre-existing lottery game system wherein the pre-paid telephone card has human readable or machine readable indicia such as a bar code or magnetic strip which is generated in conjunction with an identification code that is provided or assigned by the lottery service provider.

It is another object of the invention to provide a pre-paid telephone card system for use in conjunction with a separate or pre-existing lottery game system wherein the separate or pre-existing lottery game system reads the machine readable indicia; and generates a lottery ticket entry in an lottery game that is independent of the telephone card issuer or a credit towards the purchase of a lottery ticket, only if the human readable or machine readable indicia matches the identification code known to the lottery service provider.

It is another object of the invention to provide a pre-paid telephone card system for use in conjunction with a separate or pre-existing lottery game system wherein a separate or pre-existing lottery system agent terminal is operable to generate a lottery ticket having the lottery number if the human readable or machine readable indicia matches the identification code wherein the lottery number is provided by the user.

It is generally an object of the invention to provide a method secure activation and for cooperatively promoting the sale of telephone usage services by a telephone service provider and goods and/or services such as lottery tickets associated with a lottery game by a lottery service provider.

These and other objects are accomplished by a pre-paid telephone card and pre-paid telephone card system for use in conjunction with telephone usage service and a lottery game system for providing lottery service such as ticket generation, tracking functions, verification and redemption of winnings. A pre-paid telephone card in accordance with the invention has a substrate such as paper, paperboard or plastic, an identification number or PIN which optionally is covered by a removable opaque coating and machine readable indicia such as a bar code, magnetic strip or other data carrying medium, used to link the phone card to an independent lottery game such as a state sponsored Pick 6 or the like. Users purchase the pre-paid phone card for a fixed fee which entitles the user to a set amount of long distance phone service and at least one promotional lottery ticket. Long distance telephone service as defined herein includes traditional land based telephone service and wireless (e.g., cellular) telephone service the like.

The human readable or machine readable indicia is used to encode an identification code which identifies the phone card as one which is entitled to a promotional lottery ticket or at least a credit towards the purchase of a lottery ticket (a discount in the price of the lottery ticket) and/or allows the lottery system to recognize when the user's right to a lottery ticket or discount has been exhausted. The identification code provides a means for securely linking a separate or pre-existing lottery game to a pre-paid telephone card without the need for actually preselecting or otherwise communicating a lottery number for pre-printing on the phone card. The promotional lottery ticket is issued at a separate or pre-existing lottery agent terminal under secure and regulated conditions. The user's lottery number is selected via currently available methods such as user selection or a machine generated quick pick.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
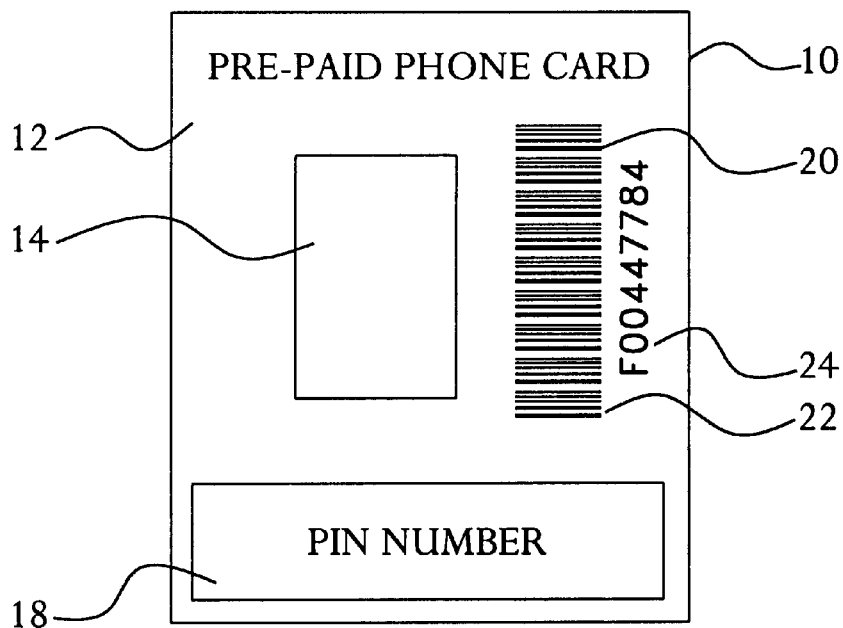
FIG. 1 is a schematic representation of a pre-paid telephone card (phone card) and associated bar code indicia with a PIN number covered by a removable opaque coating in accordance with the invention.

A pre-paid telephone card (phone card) 10 in accordance with the invention is shown in FIG. 1. The phone card has a substrate 12 formed from paper stock, paperboard, plastic or the like. The phone card is preferably the size of a typical credit card (approximately 5.4 cm×8.6 cm) for convenient storage in a purse or wallet. The phone card has at least a portion of the substrate which is suitable for graphics 14 or the like, shown as a rectangular area in FIGS. 1–3. The phone card can be larger, or smaller than a conventional credit card. For example, a larger phone card can provide an increased area for graphics or the like; smaller phone cards can be sized for storage on a key chain or the like. The phone card is imprinted with a personal identification number (PIN) 16 which is shown in covered by a removable opaque coating 18 and machine readable indicia 20.

Figure 2:
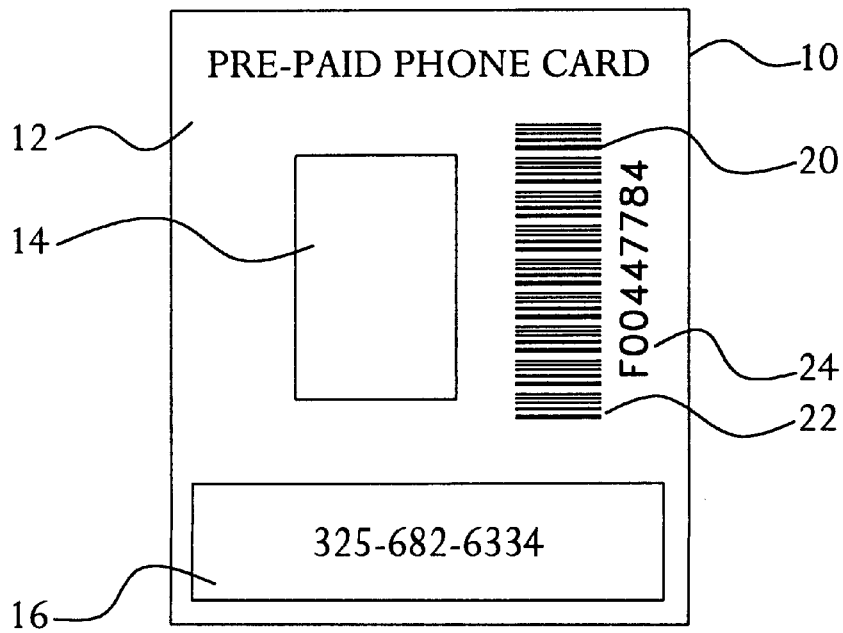
FIG. 2 is a schematic representation of a pre-paid phone in accordance with FIG. 1 showing the PIN number after removal of the removable opaque coating in accordance with the invention.

FIG. 2 shows a phone card with the opaque coating 18 removed revealing the PIN number 16 which is preferably uniquely associated with a single phone card. For security purposes it is desirable to select a PIN number having at least 10 digits, providing several billion possible code combinations. For cases in which large numbers of phone cards are produced, the PIN number is advantageously produced in a randomized fashion to provide maximum security. In the alternative, the PIN number can be produced in a serialized fashion starting with a base number and incrementing the PIN number to be imprinted on subsequent phone cards.

The machine readable indicia 20 shown in FIGS. 1 and 2 is standard bar code symbology. There are several different bar code symbologies in common usage today such as UPC, UPC/EAN-Code 128, Code 39, Interleaved 2 of 5 and Codabar. UPC bar code is typically used to identify products for point of sale retail applications such as grocery and retail stores. UPC bar code consists of 4 parts; the 1st number is the system identifier; next 5 digits are the manufacturers assigned number; next 5 digits are the manufacturer's own assigned product number and the last digit is the check digit. The manufacturer's assigned number generally issued from the Uniform Code Council in the USA or in Canada, the Product Code Council of Canada. UPC/EAN- Code 128 symbology is generally used in a standard format for identifying products on shipping containers. Code 39 or Code 3 of 9 is the most common symbology for bar codes used in general purpose bar code systems. Code 39 as well as Code 128 are both alpha/numeric and are very flexible. Interleaved 2 of 5 bar code symbology supports numbers only and has five bars, two of which are wide. In this code both the bars and spaces carry information. See AIM X5-1 USS I ⅖ for specifications. Codabar is typically used by libraries however some libraries have converted to Code 39 symbology.

In the present embodiment, the machine readable indicia is preferably a bar code 22 in Interleaved 2 of 5 format and has an associated check number 24 used to verify the validity of the bar code. The bar code is machine readable and correlates to an number preferably uniquely associated with a single phone card (machine readable indicia code). For cases in which large numbers of phone cards are produced, the bar code can be produced in a randomized fashion to provide maximum security. In the alternative, the bar code can be produced in a serialized fashion starting with a base number and incrementing the bar code to be imprinted on subsequent phone cards. Other embodiments can alternatively use Code 39 format bar codes for identification codes with alpha/numeric characters (i.e., alphabetic letter, number or both).

Figure 3:
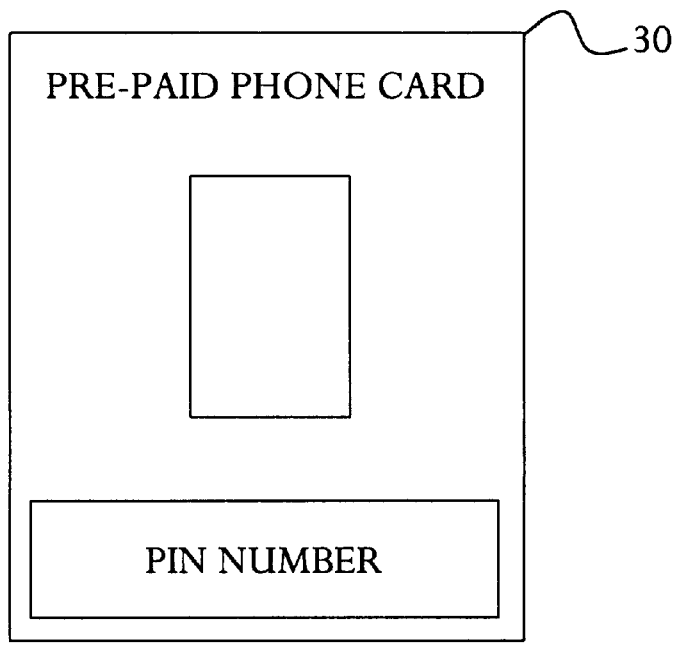
FIG. 3 is a schematic representation of the front of a pre-paid phone card with a PIN number covered by a removable opaque coating in accordance with the invention.
Figure 4:
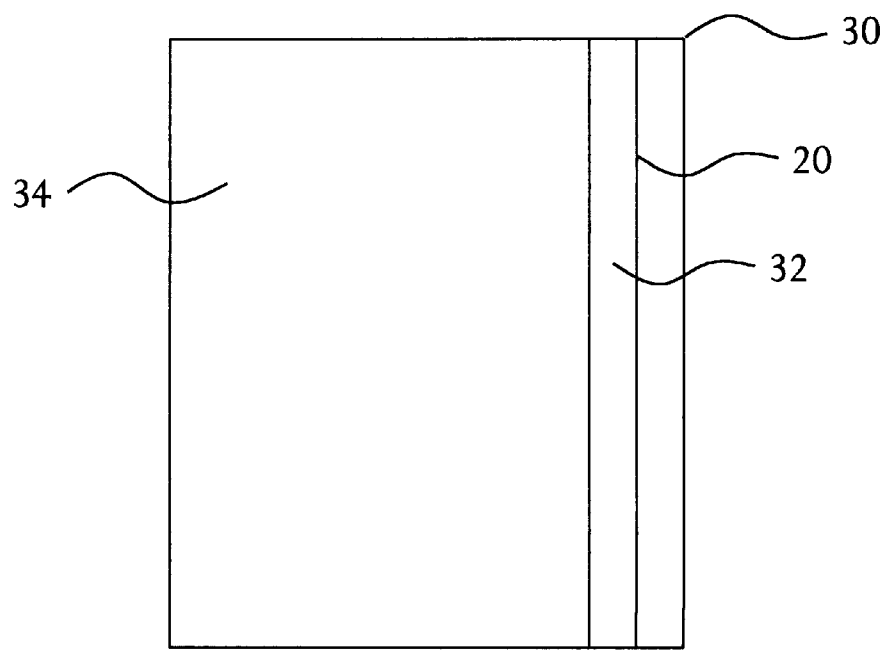
FIG. 4 is a schematic representation of the back of the pre-paid phone in accordance with FIG. 3 showing a magnetic strip in accordance with the invention.

FIG. 3 shows an alternative embodiment in which the phone card 30 has machine readable indicia 20 in the form of a magnetic strip 32 encoded on the rear surface of the card 34 (FIG. 4). Magnetic strips are in common usage today and are most frequently associated with the banking industry for use on credit cards, debit cards and the like. At least two data encoding standards exist regarding magnetic strip technology as approved by the American National Standards Institute (ANSI) and the International Standards Organization (ISO), namely ANSI/ISO BCD Data Format and ANSI/ISO BCD ALPHA Data Format. The BCD Data format generally uses five bits per character, 4 bits are used for a 16 character set Binary Coded Decimal (BCD) having a value of 0 to 15 (0-F Hexadecimal) the last bit is used as a parity bit. The BCD ALPHA format generally uses seven bits per character, 6 bits are used for a 64 character set including fill alpha numerics and several special characters (such as !, ", #, $, %, & and the like). Data on a typical magnetic strip is encoded from left to right and is divided into three separate longitudinal tracks extending the length of the magnetic strip. Each individual track is located in a relatively precise position within the magnetic strip. Each of the tracks also has a specific data format which is generally used to encode information such as account numbers, expiration dates, encrypted PIN numbers and the like. Magnetic strips for use with the invention need only encode a unique "random" or "serial" number for each individual phone card. Thus, both magnetic strips encoded in ANSI/ISO BCD Data Format and ANSI/ISO BCD ALPHA Data Format are compatible with the invention. As above, for cases in which large numbers of phone cards are produced, the magnetic strip is advantageously encoded with a unique number in a randomized fashion to provide maximum security. In the alternative, the magnetic strip can be encoded in a serialized fashion starting with a base number and incrementing the number to be encoded on subsequent phone cards.

Other machine readable indicia are possible, such as other forms of optical encoding such as bullseye "bar" codes, two dimensional bar codes, magnetic encoding techniques other than magnetic strips, radio frequency encoding and on-board nonvolatile data memory.

Figure 5:
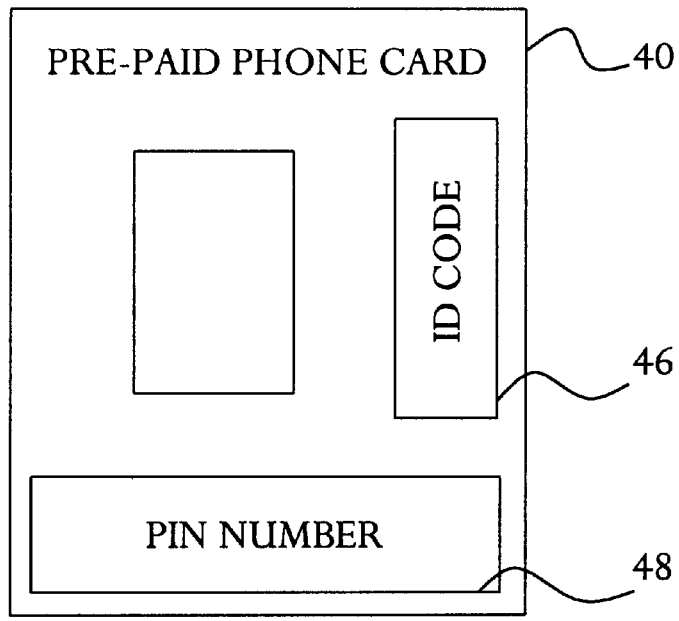
FIG. 5 is a schematic representation of the front of a pre-paid phone card with a PIN number and an ID CODE covered by a removable opaque coating in accordance with the invention.
Figure 6:
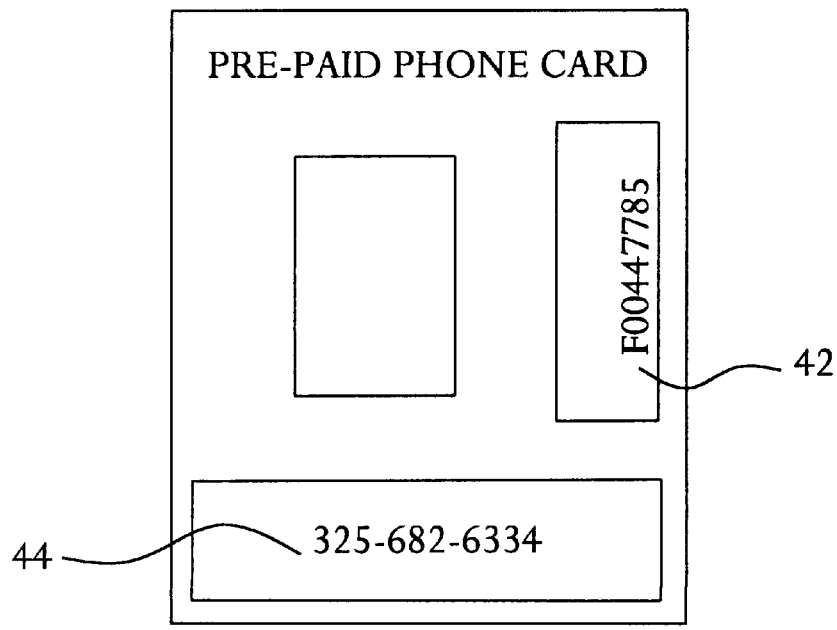
FIG. 6 is a schematic representation of a pre-paid phone in accordance with FIG. 5 showing the PIN number and ID CODE after removal of the removable opaque coating in accordance with the invention.

FIGS. 5 and 6 show a phone card 40 which is similar to the phone card shown in FIGS. 1 and 2 respectively however, human readable indicia 42 is used in place of machine readable indicia. The PIN number 44 and human readable indicia 42 as shown in FIG. 5 is covered by an opaque coatings 46 and 48 respectively. FIG. 6 shows the phone card with opaque coatings 46 and 48 removed revealing the PIN number 44 and human readable indicia 42 which are preferably uniquely associated with a single phone card.

Figure 7:
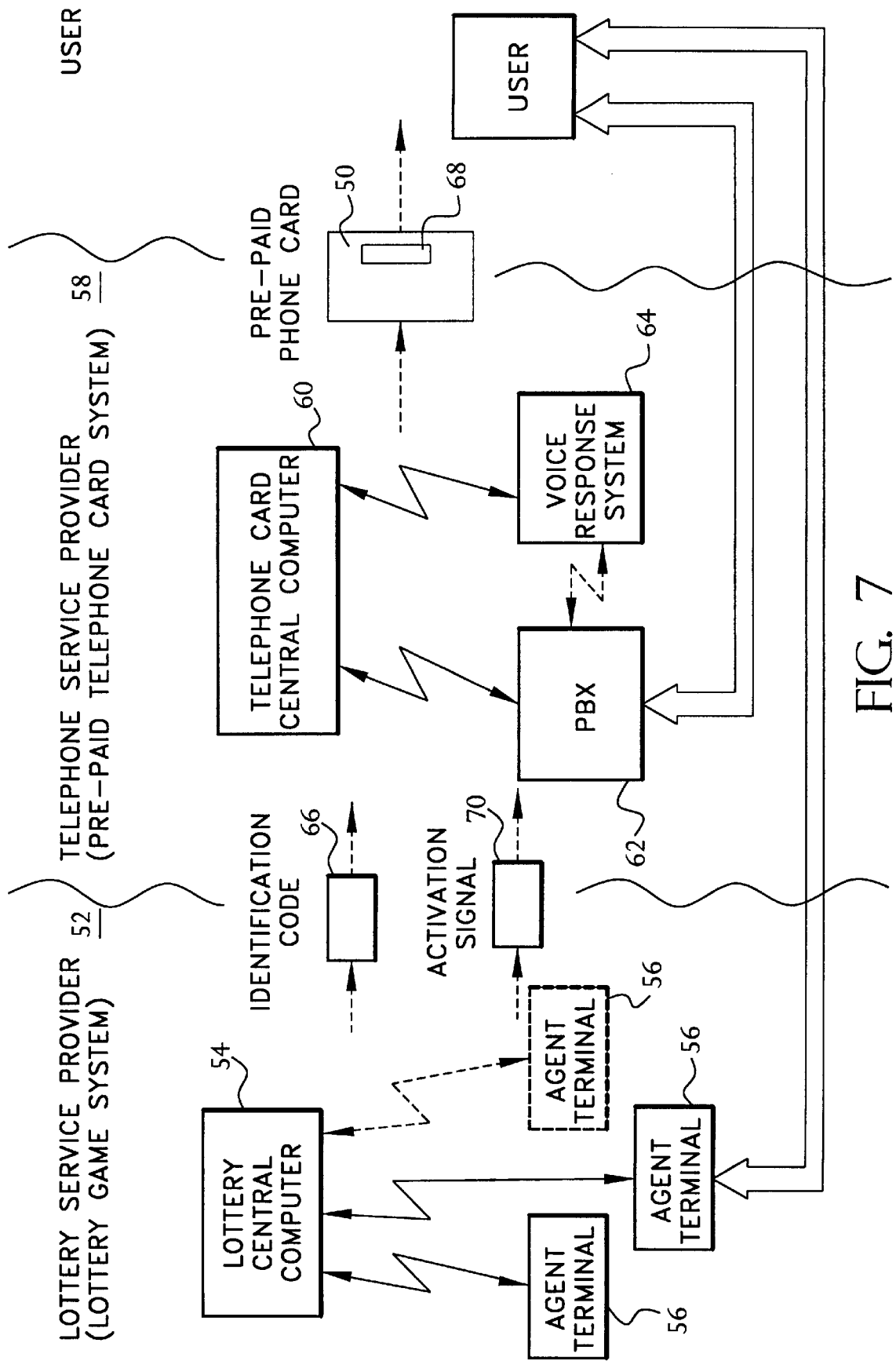
FIG. 7 is a block diagram showing a lottery game system and pre-paid telephone card system in accordance with the invention.

FIG. 7 shows a block diagram of a lottery game system and pre-paid telephone card system in accordance with the invention. Users purchase a pre-paid phone card 50 in accordance with the invention for a fixed fee which entitles the user to a set amount of long distance phone service and, in a preferred embodiment, a promotional lottery ticket. Long distance phone service as defined herein includes, but is not limited to, traditional land-based long distance telephone service and wireless (e.g., cellular) telephone service the like.

The lottery game system, provided by the lottery service provider 52, generally includes a lottery central computer 54 in data communication with a plurality of agent terminals 56 for general administration of a separate or pre-existing lottery game (i.e., not associated with the telephone service provider). The agent terminals are used activate the phone card, and in a preferred embodiment, issue and manage lottery tickets. In so doing, the agent terminal accepts operator input, communicates with a central computer for activation of the phone card, entering a player entry and receiving verification from the central computer that the entry is accepted, printing lottery tickets that typically bear the player selections, and communicating with the central computer to validate previously issued lottery tickets as winners or to determine their status. In the case of a state run lottery game such as the Pick 4 game, for example, users purchase tickets having a lottery number consisting of 4 digits. For security purposes, the winning numbers are selected by an independent entity having no relation to the lottery service provider, such as the state lottery agency contracting for lottery computer services. A winning ticket matches all four digits in the exact order as the winning number. In some cases, lower prizes are available from matching three digits in the correct order. Users compare their lottery number with the winning number and then validate and redeem tickets with the winning combination at an agent terminal. Other games such as a Pick 6 are played similarly, and other forms of games are also applicable such as keno games, bingo games and other variations.

The pre-paid telephone card system 58 generally includes a telephone card central computer 60 and associated telephone equipment. The telephone card central computer is generally operable to track a cash value and to verify a PIN number, both associated with a pre-paid telephone card. The associated telephone equipment generally includes telephone hardware such as a private branch exchange (PBX) 62 coupled to multiple central office phone lines (not shown) which are serviced or answered by an automated telephone answering system typically called a voice response system 64, the PBX and the automated telephone answering system being in data communication with the telephone card central computer.

A pre-paid phone card user purchases the phone card 50 either directly or indirectly from a telephone service provider for a fixed amount of money such as $10.00. The user is then entitled to $10.00 worth of long distance telephone service and, in a preferred embodiment, a promotional lottery ticket for a separate or pre-existing lottery game. The telephone card central computer system correlates the PIN and the cash value associated with the phone card and tracks telephone usage of the card. As the charges associated with usage of the phone card accrues, the cash value of the phone card is automatically debited by the central computer until all of the cash value associated with the card is exhausted. The telephone service provider also attends to payment of any long distance service provided by a long distance telephone service provider such as AT&T, MCI and SPRINT for any long distance telephone usage associated with the phone card.

In a preferred embodiment, the telephone service provider maintains a toll free number which is serviced by the automated telephone answering system. The pre-paid phone card is also imprinted with the toll free number and user instructions on how to place calls in association with the phone card. Users are generally instructed to call the toll free number in order to initiate a call. The automated telephone answering system answers calls to the toll free number, provides audio instructions to the user which prompts the user for telephone keypad input (touch tones) representing the PIN and the telephone number they wish to reach (called party number). The automated telephone answering system and/or central computer verifies the PIN and the current cash value associated with the phone card, and assuming the card is valid and has a sufficient cash value, automatically dials the called party number thereby placing the telephone call for the user.

To cooperatively promote the sale of telephone usage services by the telephone service provider and the sale of lottery tickets associated with a lottery game by the lottery service provider the invention provides a secure way in which the telephone service provider and lottery service provider are at least partially linked in a secure manner. Unlike an ordinary phone card, the phone card in accordance with the invention is imprinted with specialized human readable or machine readable indicia. In the case of bar code machine readable indicia, the identification code is preferably a base alpha/numeric character to be imprinted on the first phone card. In the case of machine readable indicia, the identification code is also preferably a base alpha/numeric character to be encoded on the first phone card. Preferably each subsequent phone cards are imprinted and/or encoded with an incremented value alpha/numeric character in serialized fashion. The machine readable or human readable indicia is used as a secure link between the lottery service provide and the telephone service provider and identifies the phone card as one entitled to a promotional lottery ticket.

As shown in FIG. 7, the lottery service provider communicates an identification code 66 to the telephone service provider. Phone cards are subsequently printed or produced by the telephone service provider and/or an independent third party with machine readable or human readable indicia 68 corresponding to the identification code 66. The identification code is not a lottery number, nor can a lottery number be derived from the identification code. The identification code is used to identify a phone card which is entitled to activation and, in a preferred embodiment, a promotional lottery ticket in order to promote the sale of telephone usage service and lottery tickets. Thus, the identification code provides a means for securely linking a pre-paid telephone card to promotional goods and/or services. In the present embodiment the pre-paid telephone card is linked to a separate or pre-existing lottery game to a pre-paid telephone card without the need for actually communicating a lottery number.

In some case the lottery service provider receives payment from the telephone service provider for the promotional lottery tickets associated with the pre-paid telephone cards. In this sense the lottery ticket is not free rather it is a promotional ticket provided at no charge from the user's perspective. In one embodiment, the lottery service provider receives a lump sum payment in return for an identification code and authorization for a fixed number of serialized phone cards. In another embodiment, the lottery service provider receives a payment for each lottery ticket actually generated or printed at an agent terminal. In this case, the lottery service provider must communicate to the telephone service provider that a lottery ticket has been printed. The telephone service provider then arranges for payment for the lottery tickets printed over a fixed period.

In a preferred embodiment, the phone card is automatically activated upon presentation to the lottery agent terminal 56. The lottery agent terminal is operable to read the human or machine readable indicia and compare the indicia to the identification code. The lottery service provider then generates an activation signal 70 for signifying that the pre-paid phone card is activated if the human or machine readable indicia corresponds to the identification code 66. The activation signal is preferably an electronic signal communicated from the lottery service provider to the telephone service provider using a standard modem and telephone line link (not shown). The activation signal identifies the machine readable indicia code which is uniquely associated with a single phone card. Upon receipt of the activation signal, the telephone card central computer correlates the machine readable indicia code in order to log that the phone card is activated. The telephone service provider can also log the number of cards activated over a fixed period and subsequently arrange for payment of the lottery tickets printed to the lottery service provider.

Figure 8:
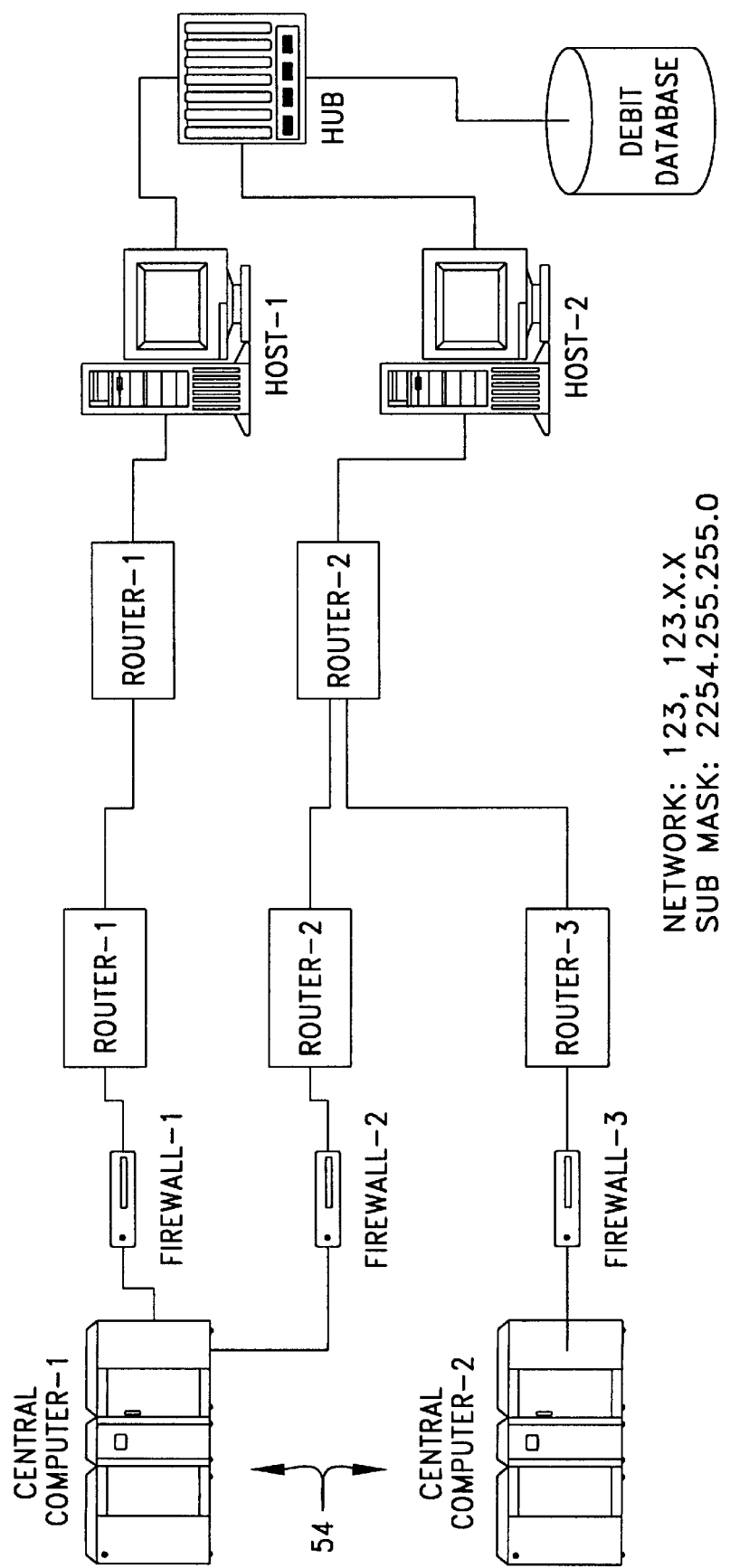
FIG. 8 is a block diagram showing a pre-paid activation network in accordance with the invention.

FIG. 8 shows a block diagram of a pre-paid activation network in accordance with the invention. The pre-paid activation network is used to automatically activate the phone card upon presentation to a lottery agent terminal (not shown) in a secure fashion. In a preferred embodiment, activation via the lottery agent terminal is required prior to using the phone card. An associated promotional lottery ticket or the like may or may not be provided. However, the pre-printed phone cards would not become functional until activated via the lottery agent terminal.

The lottery service provider maintains a lottery central computer 54 in data communication with a plurality of agent terminals (not shown) for general administration of one or more lottery games. FIG. 8 shows a two central computer system, a main computer—Central Computer—1, and a redundant backup computer—Central Computer 2. Upon presentation of a new pre-paid phone card to a lottery agent terminal (not shown), the lottery agent terminal is operable to read the human or machine readable indicia from the phone card and transmit this information to the lottery central computer. The lottery central computer then compares the indicia to the identification code and generates an activation signal only if the indica corresponds to the identification code.

The activation signal is communicated electronically to the telephone service provider. FIG. 8 shows an example of a TCP/IP (Transmission Control Protocol/Internet Protocol) network in accordance with the invention. TCP/IP is the basic communication language or protocol of the Internet. It can also be used as a communications protocol between two or more private networks.

The activation signal is communicated from the Lottery Service Provider portion of the network, from the main computer (Central Computer—1) through firewall-1 and Router-1 to the Telephone Service Provider portion of the network. In general, a firewall is a set of related programs that protects the resources of a private network from users from other networks. Basically, a firewall filters all network information to determine whether to forward the information toward its destination. A router is a device or, in some cases, software in a computer, that determines the next network point to which a given piece of information (i.e., packet) should be forwarded toward its final destination.

The activation signal is received via telephone service provider Router-1 and is transferred to Host-1. The term "host" generally means a device or program that provides services to some smaller or less capable device or program. In this case the host accesses the debit database via the hub. Generally, the word "hub" means a convergence place where data comes in from one or more directions and is forwarded out in one or more other directions. The debit database is also in communication with the telephone service provider central computer (not shown) and is used to correlate the PIN number and the cash value or a fixed time usage value associated with the phone card and to monitor usage of the phone card. In general, each phone card is assigned at least one record in the debit database. The record contains data representing phone card usage, associated PIN number and activation status. Upon receipt of the activation signal, the host accesses the debit database and updates the record in the debit database to reflect that a given phone card is activated. This allows a user to begin use of the pre-paid phone card correlated with the given PIN number.

Upon activation, the Host-2 sends an ACK (acknowledge) signal to the lottery service provider to signal that activation is complete and acknowledged. In one embodiment, receipt of the ACK signal signifies that the lottery service provider is authorized to provide promotional goods and/or services (such as a promotional lottery ticket) in association with activation of the phone card. The ACK signal is returned to the phone card service provider via telephone service provider router-2, lottery service provider routers 2 and 3, firewalls 2 and 3. The ACK signal is returned to both the main computer (Central Computer-1) and the redundant backup computer (Central Computer 2).

The lottery central computer(s), firewalls and routers as well as the telephone service provider hosts and routers are all assigned a unique network number that forms its unique Internet Protocol (IP) address. In this case, the pre-paid activation network is generally designated by an IP address in the form of 123.123.X.X. The term IP address is generally refers to a 32-bit number that identifies each sender or receiver of information on the network. When information is requested or sent, the Internet Protocol part of TCP/IP includes the requestor's (sender's) IP address in the message (actually, in each of the packets if more than one is required). At the other end, the recipient can retrieve the requested information and return it to requestor's IP address .

The IP address is usually expressed as four decimal numbers, each representing eight bits, separated by periods. This is sometimes known as the dot address and, more technically, as dotted quad notation. For Class A IP addresses, the numbers would represent "network.local.local.local"; for a Class B IP address, they would represent "network.network.local.local"; for a Class C IP address, they would represent "network.network.network.local". This number version of the IP address can (and usually is) represented by a name or series of names called the domain name.

In this case, the pre-paid activation network uses a Class B IP address with the network portion of the IP address being 123.123. The local portion of the IP address is unique for each individual device (for example a server (123.123.2.1), a firewall (123.123.3.1), a router (123.123.4.1), host (123.123.5.1), workstation etc. etc.) within that network.

The pre-paid activation network is also assigned a subnet mask (Sub Mask) designated as 255.255.255.0. A subnet (short for "subnetwork") is an identifiably separate part of an organization's network. Typically, a subnet may represent all the machines at one geographic location, in one building, or on the same local area network (LAN). Having an organization's network divided into subnets allows it to be connected to the Internet with a single shared network address. Without subnets, an organization could get multiple connections to the Internet, one for each of its physically separate subnetworks, but this would require an unnecessary use of the limited number of network numbers the Internet has to assign. It would also require that Internet routing tables on gateways outside the organization would need to know about and have to manage routing that could and should be handled within an organization.

The pre-paid activation network as shown in FIG. 8 provides a secure way of activating the phone cards using the existing lottery agent terminal network. The invention as disclosed is advantageous in that only minor modification of the existing lottery service provider computer system is required to form a secure pre-paid activation network. It is understood that activation can be accomplished in other ways, including but not limited to, a fully manually initiated voice telephone connection (between the lottery and telephone service providers) or by a simple data connection between the lottery and telephone service providers. Such a data connection includes dial up access, remote terminal connections via modem or the like.

In another embodiment users are also required to provide a user selected personal identification number (User PIN) to be uniquely associated with the phone card upon initially calling the toll free number. In this case, the user places an initial call to the toll free number. The automated telephone answering system answers the call, provides audio instructions to the user and receives telephone key pad input from the user for entry of the User PIN. The automated telephone answering system and/or central computer system then utilizes the User PIN and the pre-printed PIN to verify secure usage of the phone card prior to placement of a call.

The invention as disclosed is advantageous in that the ordinary selection of lottery numbers in pre-existing lottery games is unaffected. Users are able to select lottery numbers for separate or pre-existing lottery games in conformance with established practices. In some cases, users select their own lottery numbers at the lottery agent terminal, in other cases the lottery agent terminal generates a random lottery number for the user called a quick pick. Regardless of how the lottery number is selected, the invention eliminates the need to pre-select and/or communicate lottery numbers outside of established channels currently in use in the lottery industry.

The invention as described above discloses the use of a personal identification number (PIN), and identification code referenced to machine readable and/or human readable indicia in association with the provision of phone service, activation of the phone card and provision of a promotional good or service. It is understood that the PIN number and indicia referenced to the identification code can be a single indicia. It is also understood that additional indicia can be included on the telephone card for increased security. For example, indicia correlated to particular card lots, vendors, geographic areas, dates and the like.

In the forgoing embodiments, the telephone service provider verifies whether the indicia associated with the pre-paid telephone card is referenced to the identification code. It is also understood that the telephone service provider (goods and services provider) can alternatively or additionally verify that the indicia associated with the pre-paid telephone card is referenced to the identification code prior to activation of the telephone card or provision of telephone services.

The invention as disclosed above is ideally suited to linking a pre-paid telephone card with a pre-existing lottery game. However, the invention is also useful for linking a pre-paid telephone card with the provision of goods and/or services as part of a promotion. The PIN number is generally used for verification and tracking of telephone service usage. The machine readable or human readable indicia is generally used for verification and tracking of associated goods and/or services provided as part of a promotion. The printing capabilities of the lottery agent terminal are used to generate a coupon or voucher associated with the provision of goods and/or services (i.e., a coupon for credit towards the purchase price of the goods or services or a voucher for the provision of the goods or services). The coupon or voucher provides at least a credit towards the purchase of the goods or services (a discount in the price of the goods or services). In a preferred embodiment the telephone services and promotional goods and/or services are provided by separate business entities. However, the invention is suitable for linking telephone services and associated promotional goods and/or services provided by a single business entity.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method for providing telephone services comprising:
   communicating an identification code from a lottery service provider to a telephone service provider;
   generating an indicia corresponding to the identification code;
   providing a pre-paid telephone card with an associated PIN number and the indicia corresponding to the identification code;
   the lottery service provider, upon presentation of the pre-paid telephone card, verifying that the indicia associated with the pre-paid telephone card is referenced to the identification code and generating an activation signal for signifying that the pre-paid phone card is activated if the indicia associated with the pre-paid telephone card corresponds to the identification code;
   the telephone service provider receiving the activation signal from the lottery service provider and providing telephone services in conjunction with the pre-paid telephone card only upon receipt of the activation signal and verification of the validity of the PIN number associated with the pre-paid telephone card.

2. The method of claim 1 wherein the telephone service provider, upon receiving the activation signal from the lottery service provider, generates an acknowledge signal, the lottery service provider receiving the acknowledge signal and providing a lottery ticket in conjunction with the pre-paid telephone card.

3. The method of claim 1 wherein the indicia is machine readable.

4. The method of claim 3 comprising:
   the lottery service provider providing a lottery central computer in data communication with at least one agent terminal for generating and validating lottery tickets and for reading the machine readable indicia associated with the pre-paid telephone card;
   the lottery service provider reading the machine readable indicia on the pre-paid telephone card using the agent terminal; and
   the lottery service provider providing at least one of credit towards the purchase of a lottery ticket and a lottery ticket for the lottery game using the agent terminal only if the machine readable indicia associated with the pre-paid telephone card corresponds to the identification code.

5. The method of claim 1 wherein the pre-paid telephone card has an associated usage value representing a cash value of long distance service available.

6. The method of claim 1 wherein the pre-paid telephone card has an associated usage value representing a time value of long distance service available.

7. The method of claim 1 wherein the indicia is a machine readable bar code.

8. The method of claim 1 wherein the indicia is a machine readable magnetic strip.

9. The method of claim 1 comprising:
   the telephone service provider providing telephone service equipment and a telephone card central computer operable to monitor usage of the pre-paid telephone card, store and adjust a usage value associated with the pre-paid telephone card and to verify a PIN number associated with the pre-paid telephone card;
   the telephone service provider receiving and verifying the validity of the PIN number associated with the pre-paid telephone card using the telephone service equipment and telephone card central computer;
   the telephone service provider providing telephone service, monitoring the usage of the pre-paid telephone card and adjusting the usage value associated with the pre-paid telephone card based on usage of the pre-paid telephone card if the PIN number is valid.

10. The method of claim 9 wherein the usage value is a cash value representing the amount of long distance service available.

11. The method of claim 9 wherein the usage value is a time value representing the time of long distance service available.

12. The method of claim 1 wherein the telephone service provider and the lottery service provider are a single business entity.

13. A pre-paid telephone card system for use in conjunction with a separate lottery game system comprising:
   a pre-paid telephone card system having associated telephone hardware and a telephone card central computer operable to provide telephone service, track a usage value and to verify a PIN number, both associated with the pre-paid telephone card;
   a lottery game system having a lottery central computer and a plurality of associated agent terminals for generating and validating lottery tickets and for reading machine readable indicia representing an identification code associated with the pre-paid telephone card;
   a pre-paid telephone card having a pre-printed PIN number and machine readable indicia corresponding to the identification code;
   wherein the pre-paid telephone card system is operable to provide telephone service using the pre-paid telephone card system if the PIN number is valid, the pre-paid telephone card system being able to track usage of the pre-paid telephone card and to adjust the usage value associated with the pre-paid telephone card based on usage; and,
   wherein the lottery game system is operable to generate a lottery ticket for the separate lottery game if the machine readable indicia matches the identification code.

14. The system of claim 13 wherein the machine readable indicia is a bar code.

15. The system of claim 13 wherein the machine readable indicia a magnetic strip.

16. The system of claim 13 comprising:

the lottery game system having a means for generating an output for signalling that the pre-paid phone card is activated using the lottery game system if the machine readable indicia matches the identification code;

means for communicating the output for signalling that the pre-paid phone card is activated, the pre-paid telephone card system having a means for receiving the output for signalling that the pre-paid phone card is activated; wherein the pre-paid telephone card system is operable to provide telephone service only if the output for signalling that the pre-paid telephone card is activated has been received.

17. A method for cooperatively promoting the sale of telephone usage services by a telephone service provider and goods or services by a goods and services provider comprising:

communicating an identification code from the goods and services provider to the telephone service provider for use in association with a pre-paid telephone card;

generating an indicia corresponding to the identification code;

providing the pre-paid telephone card with an associated PIN number and the indicia corresponding to the identification code;

the telephone service provider verifying the validity of the PIN number associated with the pre-paid telephone card and providing telephone services in conjunction with the pre-paid telephone card only if the PIN number is valid; and, the goods and services provider, upon presentation of the pre-paid telephone card, verifying that the indicia associated with the pre-paid telephone card is referenced to the identification code and in that event providing at least one of promotional goods and services provided the indicia associated with the pre-paid telephone card corresponds to the identification code.

18. The method of claim 17 wherein the indicia is machine readable.

19. The method of claim 17 wherein the usage value is a cash value representing the amount of long distance service available.

20. The method of claim 17 wherein the usage value is a time value representing the time of long distance service available.

21. The method of claim 17 wherein the indicia is a machine readable bar code.

22. The method of claim 17 wherein the indicia is a machine readable magnetic strip.

23. The method of claim 17 comprising:

the goods and services provider generating an activation signal for signifying that the pre-paid phone card is activated if the indicia associated with the pre-paid telephone card corresponds to the identification code;

the telephone service provider receiving the activation signal from the goods and services provider and providing telephone services in conjunction with the pre-paid telephone card only upon receipt of the activation signal.

24. The method of claim 1 comprising:

the telephone service provider providing telephone service equipment and a telephone card central computer operable to monitor usage of the pre-paid telephone card, store and adjust a usage value associated with the pre-paid telephone card and to verify a PIN number associated with the pre-paid telephone card;

the telephone service provider receiving and verifying the validity of the PIN number associated with the pre-paid telephone card using the telephone service equipment and telephone card central computer;

the telephone service provider providing telephone service, monitoring the usage of the pre-paid telephone card and adjusting the usage value associated with the pre-paid telephone card based on usage of the pre-paid telephone card if the PIN number is valid.

25. The method of claim 24 wherein the pre-paid telephone card has an associated usage value representing a cash value of long distance service available.

26. The method of claim 24 wherein the pre-paid telephone card has an associated usage value representing a time of long distance service available.

27. The method of claim 17 wherein the telephone service provider and the goods and services provider are a single business entity.

28. The method of claim 1 wherein the PIN number and an indicia referenced to the identification code are a single indicia.

29. The method of claim 1 wherein the PIN number and an indicia referenced to the identification code are a single indicia.

30. The method of claim 13 wherein the PIN number and an indicia referenced to the identification code are a single indicia.

31. The method of claim 17 wherein the PIN number and an indicia referenced to the identification code are a single indicia.

32. The method of claim 1 wherein the telephone service provider provides wireless telephone services in conjunction with the pre-paid telephone card.

33. The method of claim 13 wherein the telephone service provider provides wireless telephone services in conjunction with the pre-paid telephone card.

34. The method of claim 17 wherein the telephone service provider provides wireless telephone services in conjunction with the pre-paid telephone card.

35. The method of claim 1 wherein the telephone service provider, upon receiving the activation signal from the lottery service provider, generates an acknowledge signal, the lottery service provider receiving the acknowledge signal and providing a coupon for credit towards the provision of at least one of goods and services.

36. The method of claim 1 wherein the telephone service provider, upon receiving the activation signal from the lottery service provider, generates an acknowledge signal, the lottery service provider receiving the acknowledge signal and providing a voucher for provision of at least one of goods and services.

* * * * *